(12) United States Patent
Liu et al.

(10) Patent No.: US 11,327,765 B2
(45) Date of Patent: May 10, 2022

(54) INSTRUCTION PROCESSING APPARATUSES, PROCESSORS, AND PROCESSING METHODS

(71) Applicant: ALIBABA GROUP HOLDING LIMITED, Grand Cayman (KY)

(72) Inventors: Chang Liu, Shanghai (CN); Tao Jiang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/986,781

(22) Filed: Aug. 6, 2020

(65) Prior Publication Data
US 2021/0089317 A1 Mar. 25, 2021

(30) Foreign Application Priority Data

Sep. 23, 2019 (CN) .......................... 201910900982.2

(51) Int. Cl.
*G06F 9/38* (2018.01)
(52) U.S. Cl.
CPC .......... *G06F 9/3836* (2013.01); *G06F 9/3867* (2013.01)
(58) Field of Classification Search
CPC .... G06F 9/3836; G06F 9/3867; G06F 9/3869; G06F 9/3017; G06F 15/7807
See application file for complete search history.

(56) References Cited

U.S. PATENT DOCUMENTS

| 8,275,976 | B2 | | 9/2012 | Glew | |
|---|---|---|---|---|---|
| 10,209,995 | B2 | * | 2/2019 | Chadha | .................. G06F 9/3834 |
| 10,324,726 | B1 | * | 6/2019 | Geary | .................. G06F 9/3842 |
| 2008/0235457 | A1 | * | 9/2008 | Hasenplaugh | ...... G06F 12/0842 711/130 |
| 2011/0283124 | A1 | * | 11/2011 | Branover | .............. G06F 1/3296 713/323 |
| 2017/0083318 | A1 | * | 3/2017 | Burger | .................. G06F 9/3859 |

(Continued)

FOREIGN PATENT DOCUMENTS

WO    WO-2011022493 A1 * 2/2011  ......... G06F 9/30072

OTHER PUBLICATIONS

International Search Report and written opinion in related International Applicational No. PCT/US2020/045152, dated Oct. 28, 2020 (9 pgs).

*Primary Examiner* — Farley Abad
(74) *Attorney, Agent, or Firm* — Finnegan, Henderson, Farabow, Garrett & Dunner, LLP

(57) ABSTRACT

Embodiments of the present disclosure provide an apparatus, comprising: one or more instruction executing circuitries, wherein each instruction executing circuitry of the one or more instruction executing circuitries is configured to execute an instruction of a corresponding instruction type, and an instruction scheduling circuitry that is communicatively coupled to the one or more instruction executing circuitries, the instruction scheduling circuitry is configured to: determine according to an instruction type of the instruction and a number of instructions that have been allocated to the one or more instruction executing circuitries, an instruction executing circuitry from the one or more instruction executing circuitries to schedule the instruction for execution, and allocated the instruction to the determined instruction executing circuitry.

18 Claims, 6 Drawing Sheets

(56) References Cited

U.S. PATENT DOCUMENTS

| | | | |
|---|---|---|---|
| 2017/0083324 A1* | 3/2017 | Burger | G06F 15/7867 |
| 2017/0093968 A1* | 3/2017 | Chin | H04L 47/782 |
| 2017/0147351 A1* | 5/2017 | Cho | G06F 9/3824 |
| 2017/0315813 A1 | 11/2017 | Smith et al. | |
| 2019/0163486 A1* | 5/2019 | Sinharoy | G06F 9/30036 |

* cited by examiner

INSTRUCTION PROCESSING APPARATUSES, PROCESSORS, AND PROCESSING METHODS

CROSS REFERENCE TO RELATED APPLICATION

This disclosure claims the benefits of priority to Chinese application number 201910900982.2, filed Sep. 23, 2019, which is incorporated herein by reference in its entirety.

BACKGROUND

Modern processors or processor cores can execute instructions in a pipelined manner. A typical pipeline usually includes various pipeline stages such as instruction fetching, instruction decoding, instruction scheduling, instruction execution, and instruction retirement. In a high-performance multi-transmitting processor, at the instruction decoding stage, a plurality of instructions can be sequentially decoded in a same clock cycle. Then at the instruction scheduling stage, the sequentially decoded instructions are transmitted out of order to each instruction execution stage according to instruction types and an instruction execution state of the downstream of the pipeline, so that a plurality of instructions can be executed simultaneously at the instruction execution stage.

SUMMARY

Embodiments of the present disclosure provide an apparatus, comprising: one or more instruction executing circuitries, wherein each instruction executing circuitry of the one or more instruction executing circuitries is configured to execute an instruction of a corresponding instruction type, and an instruction scheduling circuitry that is communicatively coupled to the one or more instruction executing circuitries, the instruction scheduling circuitry is configured to: determine according to an instruction type of the instruction and a number of instructions that have been allocated to the one or more instruction executing circuitries, an instruction executing circuitry from the one or more instruction executing circuitries to schedule the instruction for execution, and allocated the instruction to the determined instruction executing circuitry.

Embodiments of the present disclosure further provide a method, comprising: receiving an instruction; determining, according to an instruction type of the instruction and a number of instructions that have been allocated to one or more instruction executing circuitries, an instruction executing circuitry from the one or more instruction executing circuitries to schedule the instruction for execution; allocating the instruction to the determined instruction executing circuitry; and transmitting the instruction to the allocated instruction executing circuitry for executing.

Embodiments of the present disclosure further provide a system on chip, comprising: an instruction processing apparatus, comprising: one or more instruction executing circuitries, wherein each instruction executing circuitry of the one or more instruction executing circuitries is configured to execute an instruction of a corresponding instruction type, and an instruction scheduling circuitry that is communicatively coupled to the one or more instruction executing circuitries, the instruction scheduling circuitry is configured to: determine according to an instruction type of the instruction and a number of instructions that have been allocated to the one or more instruction executing circuitries, an instruction executing circuitry from the one or more instruction executing circuitries to schedule the instruction for execution, and allocated the instruction to the determined instruction executing circuitry.

Embodiments of the present disclosure further provide an intelligent device, comprising: a system on chip, comprising: an instruction processing apparatus, comprising: one or more instruction executing circuitries, wherein each instruction executing circuitry of the one or more instruction executing circuitries is configured to execute an instruction of a corresponding instruction type, and an instruction scheduling circuitry that is communicatively coupled to the one or more instruction executing circuitries, the instruction scheduling circuitry is configured to: determine according to an instruction type of the instruction and a number of instructions that have been allocated to the one or more instruction executing circuitries, an instruction executing circuitry from the one or more instruction executing circuitries to schedule the instruction for execution, and allocated the instruction to the determined instruction executing circuitry.

DETAILED DESCRIPTION

To make the objectives, technical solutions and advantages of the embodiments of the present disclosure clearer, the technical solutions in the embodiments of the present disclosure are described below with reference to the accompanying drawings in the embodiments of the present disclosure. The described embodiments are merely some rather than all of the embodiments of the present disclosure. Based on the embodiments in the present disclosure, all other embodiments obtained by those with ordinary skill in the art without creative efforts should fall within the protective scope of the present disclosure.

In an existing processor or processor core, when a pipeline for instruction execution is determined for a decoded instruction, an execution pipeline is generally allocated only according to a type of the instructions or a number of the instructions to be distributed. When an instruction can be distributed to a plurality of pipelines for processing, the processor or processor core generally selects one of the pipelines according to a fixed priority. As a result, the distribution of instructions to the plurality of pipelines are not optimized. For example, some pipelines can have instructions waiting to be executed, while other pipelines do not have instructions to be executed, thus leading to an unbalanced load of the pipelines. Some pipelines can also be left in an idling state, causing processor performance loss. Therefore, improvements can be made to allocate an appropriate pipeline to each instruction in order to minimize the processor performance loss caused by the pipeline being stopped or idle due to unbalanced load. A new processor instruction scheduling solution is needed, which can solve or alleviate the problems described above, reduce the load imbalance of the pipelines, and thus improve the performance of a processor.

In some embodiments of the present disclosure, a process instruction scheduling circuitry can be included review the number of instructions allocated to each of the instruction executing circuitries, and determine an appropriate instruction executing circuitry to execute the instruction, effectively promoting load balancing between the instruction executing circuitries.

Figure 1:
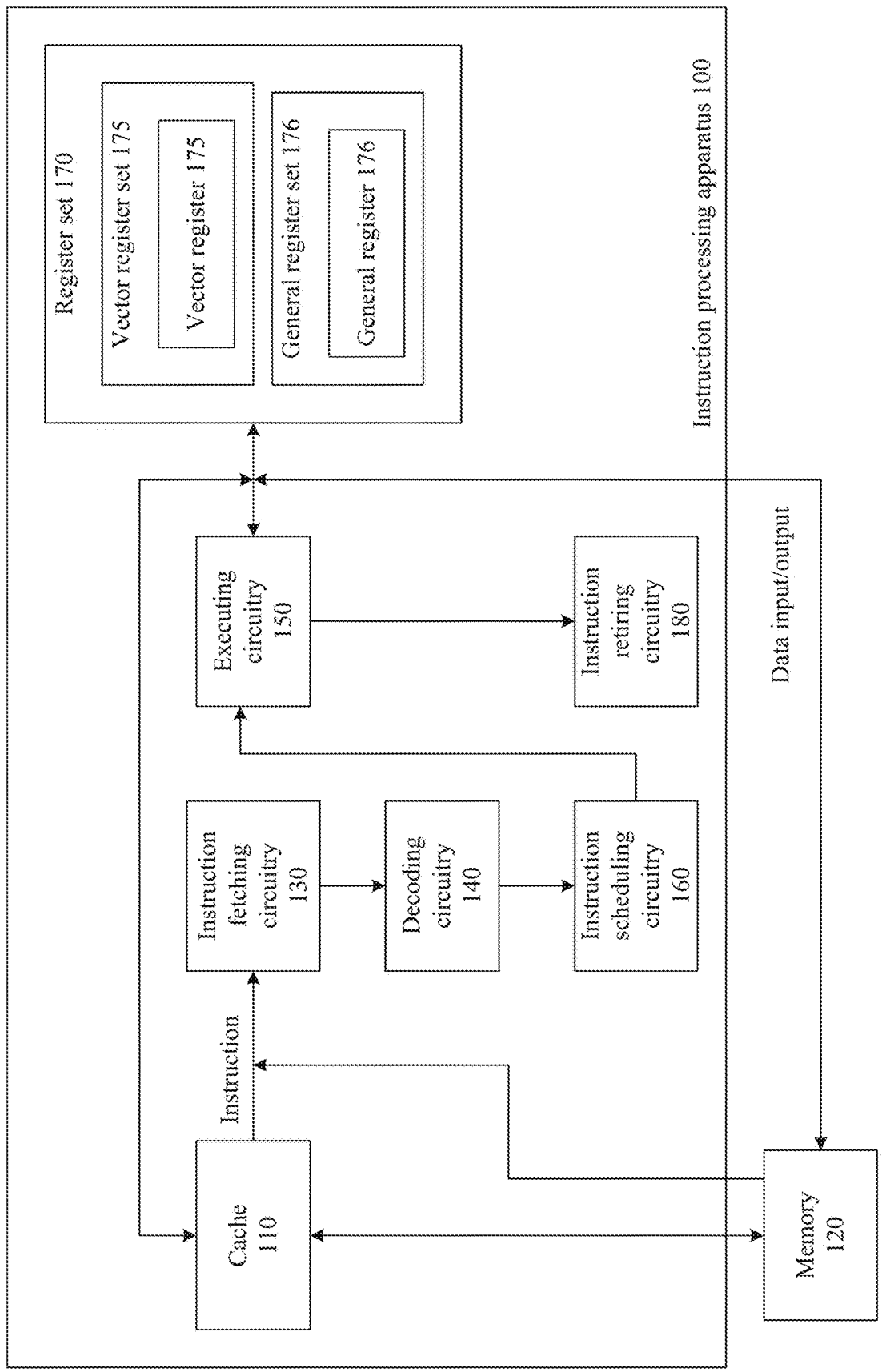
FIG. 1 is an example schematic diagram of an instruction processing apparatus, according to some embodiments of the present disclosure.

FIG. 1 is an example schematic diagram of an instruction processing apparatus, according to some embodiments of the present disclosure. In some embodiments, instruction processing apparatus 100 may be a processor, a processor core of a multi-core processor, or a processing part in an electronic system.

As shown in FIG. 1, instruction processing apparatus 100 can include an instruction fetching circuitry 130. Instruction fetching circuitry 130 can obtain instructions to be processed from cache 110, memory 120, or another memory or storage source. Instruction fetching circuitry can send the instructions to be processed to a decoding circuitry 140. The instructions fetched by instruction fetching circuitry 130 can include high-level machine instructions or macro instructions. In some embodiments, processing apparatus 100 can implement certain functions by executing these instructions.

Decoding circuitry 140 can receive instructions transmitted from instruction fetching circuitry 130 and decode these instructions. In some embodiments, decoding circuitry 140 can decode these instructions to generate low-level micro-operations, microcode entry points, micro-instructions, or other low-level instructions or control signals, which reflect the received instructions or are exported from the received instructions. The low-level instructions or control signals may implement operations of high-level instructions through low-level (e.g., circuit-level or hardware-level) operations. Decoding circuitry 140 may be implemented in many different ways or mechanisms. Examples of suitable mechanisms include microcode, a lookup table, a hardware implementation, or a programmable logic array ("PLA").

Decoding circuitry 140 can send the decoded instructions to instruction scheduling circuitry 160. Scheduling circuitry 160 can transmit the instructions decoded by decoding circuitry 140 to one or more instruction executing circuitries 150 according to instruction types of the instructions. In some embodiments, scheduling circuitry 160 can transmit the decoded instructions out of order to different instruction executing circuitries 150 for execution. In some embodiments, an instruction transmission queue can be maintained in scheduling circuitry 160. For example, in scheduling circuitry 160, a unified transmission queue may be maintained for all executing circuitries 150. A dedicated transmission queue may be maintained for one or more executing circuitries 150. A dedicated transmission queue may be maintained for the same type of instructions to facilitate transmitting the instructions to different executing circuitries 150 that can execute the same type of instructions.

In some embodiments, executing circuitry 150 can include a circuit that is operable to execute instructions. When executing these instructions, executing circuitry 150 can receive data input from register set 170, cache 110 or memory 120, and generate data to be outputted to them.

In some embodiments, register set 170 can include architectural registers, which can also be referred to as registers. Unless otherwise specified, phrases such as the architectural register, the register set, and the register are used to denote registers that are visible to software or programmers, or designated by macro instructions to identify operands. These registers are different from other non-architectural registers (e.g., a temporary register, a reorder buffer, a retirement register, etc.) in a given micro-architecture. In some embodiments, register set 170 may include a set of vector registers 175. Each vector register 175 may be 512 bits, 256 bits, or 128 bits wide. Different vector widths may be used for each vector register 175. In some embodiments, register set 170 may further include a set of general registers 176. For example, general register 176 may be used when the executing circuitry executes instructions that require storing jump conditions.

It is appreciated that there may be more than one executing circuitries in instruction processing apparatus 100. For example, instruction execution apparatus 100 may include a plurality of executing circuitries of different types, such as an arithmetic circuitry, an arithmetic logic circuitry ("ALU"), an integer circuitry, a floating point circuitry, or a jump executing circuitry. According to characteristics of the out-of-order instructions transmitted from instruction scheduling circuitry 160 (e.g., arithmetic operation instructions, floating-point number calculation instructions, conditional jump or unconditional jump instructions, etc.), these instructions can be executed by different executing circuitries 150.

After executing circuitry 150 executes an instruction, instruction retiring circuitry 180 can perform retirement processing on the executed instruction. For example, instruction retiring circuitry 180 can update content of registers or memories according to the result of the instruction execution or perform interruption or exception processing.

In some embodiments, the instruction processing apparatus or processor can have a plurality of cores, logical processors, or execution engines. For example, it is appreciated that instruction processing apparatus 100 of FIG. 1 can have a plurality of cores, logical processors, or execution engines.

Figure 2:
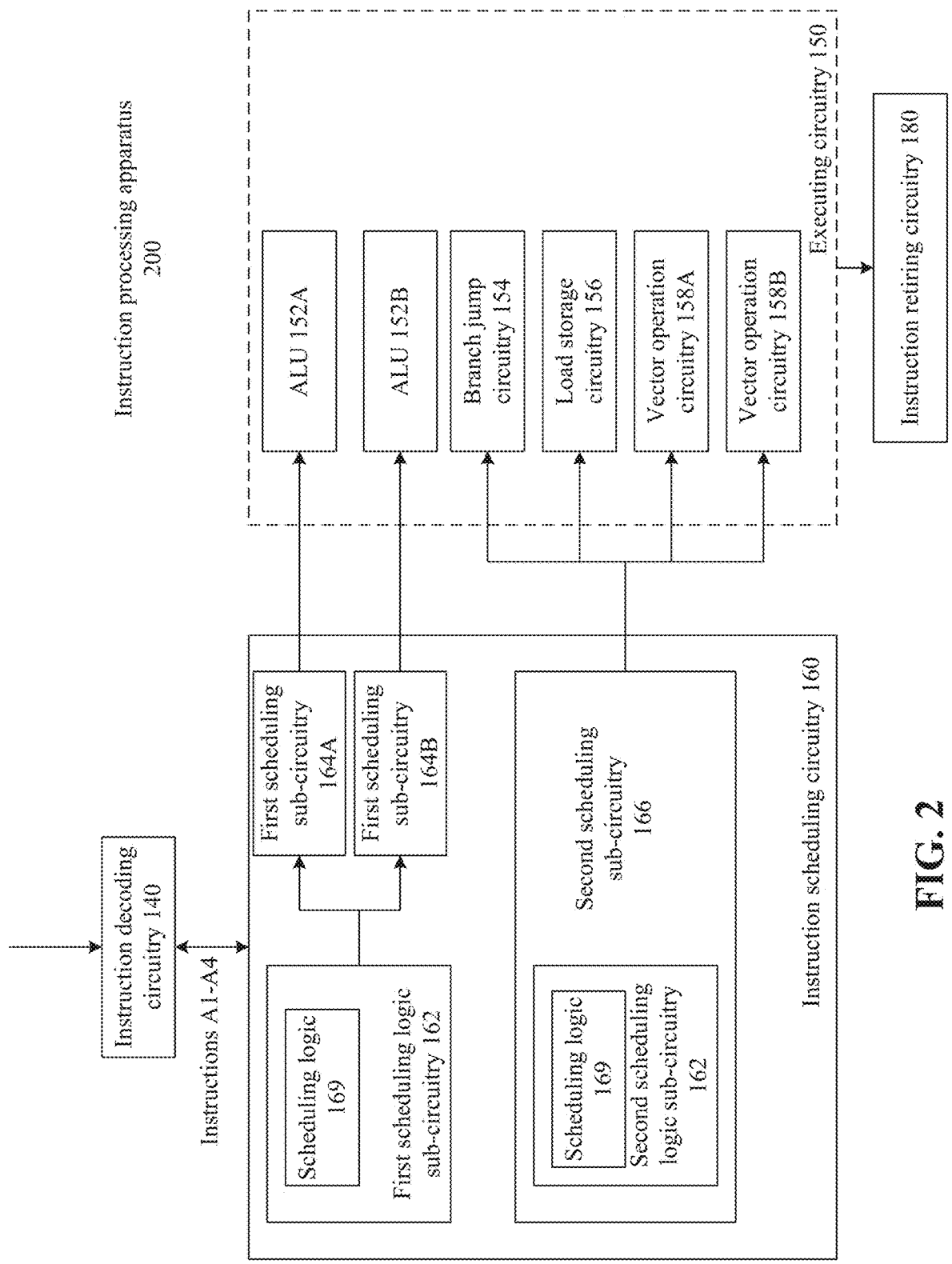
FIG. 2 is an example schematic diagram of an instruction processing apparatus including an executing circuitry, according to some embodiments of the present disclosure.

FIG. 2 is an example schematic diagram of an instruction processing apparatus including an executing circuitry, according to some embodiments of the present disclosure. Instruction processing apparatus 200 shown in FIG. 2 can include one or more parts of instruction processing apparatus 100 shown in FIG. 1. Instruction processing apparatus 200 shown in FIG. 2 can specifically describe the parts related to scheduling circuitry 160 in the instruction processing. In addition, the division of various components in various circuitries is functional, and they can be re-arranged and re-combined for physical implementation without departing from the protection scope of the present disclosure.

As shown in FIG. 2, instruction decoding circuitry 140 can decode the instruction read by instruction fetching circuitry 130 to obtain the decoded instruction. Each decoded instruction can include an instruction program counter ("PC") value or other information that can identify the instruction. In some embodiments, instruction decoding circuitry 140 can decode a plurality of instructions in one clock cycle. As shown in FIG. 2, instruction decoding circuitry 140 can decode a total of 4 instructions A1 to A4 in one clock cycle. In some embodiments, each instruction can have a corresponding program counter PC value (e.g., PC1 to PC4).

Instruction decoding circuitry 140 can send the decoded instruction to instruction scheduling circuitry 160. Instruction scheduling circuitry 160 can determine, according to an instruction type of the decoded instruction, an instruction executing circuitry 150 that is capable of executing the decoded instruction. Instruction scheduling circuitry can then allocate the decoded instruction to the determined instruction executing circuitry 150. In some embodiments, the instructions may include arithmetic operation instructions, vector floating point calculation instructions, conditional jump or unconditional jump instructions, data storage and load instructions, etc. according to the types of the instructions. Instruction scheduling circuitry 160 can transmit each instruction to a different executing circuitry 150 for execution according to the type of the instruction. As shown in FIG. 2, executing circuitry 150 has a plurality of executing circuitries, including, for example, two ALUs 152A and 152B, branch jump circuitry 154, load storage circuitry 156, or two vector operation circuitries 158A and 158B. ALUs 152A and 152B can execute arithmetic operation instructions. Branch jump circuitry 154 can perform conditional jump or unconditional jump instructions. Load storage circuitry 156 can execute data storage and load instructions. Vector operation circuitries 158A and 158B can execute vector floating point calculation instructions. For example, instructions A1-A4 shown in FIG. 2 can be arithmetic operation instructions, so they can be allocated to ALUs 152A and 152B for execution.

In some embodiments, instruction scheduling circuitry 160 can transmit the decoded instructions out of order to one or more executing circuitries 150. Therefore, instruction scheduling circuitry 160 can include a scheduling logic to determine to which executing circuitry 150 the decoded instruction is transmitted to.

In some embodiments, as shown in FIG. 2, scheduling circuitry 160 can include first scheduling logic sub-circuitry 162 and first scheduling sub-circuitry 164. Each first scheduling sub-circuitry 164 can be communicatively coupled to a corresponding part of executing circuitry 150. In the example shown in FIG. 2, first scheduling sub-circuitry 164A is communicatively coupled to ALU 152A, and first scheduling sub-circuitry 164B is communicatively coupled to ALU 152B. In some embodiments, each of first scheduling sub-circuitries 164 may transmit instructions to the corresponding executing circuitry only. In other words, first scheduling sub-circuitry 164A may transmit instructions the ALU 152A only, and first scheduling sub-circuitry 164B may transmit instructions to ALU 152B only. First scheduling sub-circuitries 164A and 164B are communicatively coupled to first scheduling logic sub-circuitry 162. First scheduling logic sub-circuitry 162 can receive the decoded instruction and determine to which of ALUs 152A and 152B the decoded instruction is to be transmitted for execution. The decoded instruction can then be sent to the corresponding first scheduling sub-circuitry 164A or 164B before the decoded instructions are sent to corresponding executing circuitries for execution.

In some embodiments, as shown in FIG. 2, scheduling circuitry 160 can further include second scheduling sub-circuitry 166. Second scheduling sub-circuitry 166 can be communicatively coupled to the plurality of executing circuitries 150. In the example shown in FIG. 2, second scheduling sub-circuitry 166 can be communicatively coupled to branch jump circuitry 154, load storage circuitry 156, or two vector operation circuitries 158A and 158B. As a result, second scheduling sub-circuitry 166 can transmit different types of instructions to corresponding executing circuitries. For example, second scheduling sub-circuitry 166 can transmit instructions having branch jumps to branch jump circuitry 154. Second scheduling sub-circuitry 166 can also include second scheduling logic sub-circuitry 168. Second scheduling logic sub-circuitry 168 can schedule different types of instructions. For example, for the vector floating point calculation instruction received by second scheduling sub-circuitry 166, second scheduling logic sub-circuitry 168 can determine to which of two vector operation circuitries 158A and 158B the instruction is to be transmitted. Having made a determination, second scheduling sub-circuitry 166 can then transmit the instruction to the determined vector operation circuitry 158A or 158B for execution.

In some embodiments, as shown in FIG. 2, instruction scheduling circuitry 160 includes two instruction scheduling structures. The first instruction scheduling structure include first scheduling sub-circuitry 164 and first scheduling logic sub-circuitry 162, and the second instruction scheduling structure include second scheduling sub-circuitry 166 and second scheduling logic sub-circuitry 168. It is appreciated that the structure of instruction scheduling circuitry 160 is not limited. For example, the first instruction scheduling structure can be configured for some types of instructions, and the second instruction scheduling structure can be configured for other types of instructions.

It is appreciated that although the above description has ALU 152A and ALU 165B as corresponding to the first instruction scheduling structure and two vector operation circuitries 158A and 158B as corresponding to the second instruction scheduling structure, the structure of instruction scheduling circuitry 160 is not limited. For example, vector operation circuitries 158A and 158B may also correspond to the first instruction scheduling structure (e.g., having respective corresponding first scheduling sub-circuitries). Similarly, ALUs 152A and ALU 165B may also correspond to the second instruction scheduling structure (e.g., managed by the corresponding second scheduling sub-circuitry).

In some embodiments, in the first structure, the scheduling sub-circuitry can maintain a list of scheduled instructions associated with a corresponding executing circuitry (e.g., maintaining a corresponding instruction transmission queue). In the second structure, the scheduling sub-circuitry needs to maintain a list of scheduled instructions for all corresponding executing circuitries. In some embodiments, the two structures are provided in order to better adapt to more types of executing circuitries. In some embodiments, both of these structures need to implement instruction scheduling logic 169 in first scheduling logic sub-circuitry 162 or second scheduling logic sub-circuitry 168. Instruction scheduling logic 169 is configured to determine, for an instruction of a specific type, an executing circuitry 150 to schedule the instruction for execution.

In some embodiments, for instructions of the same type, instruction scheduling logic 169 can determine, according to the number of instructions that have been allocated to each instruction executing circuitry 150 for executing instructions of this type, which instruction executing circuitry 150 to schedule the instruction for execution. In some embodiments, whether the instructions are of the same type can be determined according to whether the instructions are executed by executing circuitries 150 of the same type. In some embodiments, some instructions that are not of the same type but executed by executing circuitries 150 of the same type can be considered as instructions of the same type.

In some embodiments, for at least two of the plurality of instruction executing circuitries 150 that execute instructions of the same type (e.g., ALUs 152A and 152B or vector arithmetic circuitries 158A and 158B shown in FIG. 2), scheduling logic 169 can determine, according to the difference between numbers of decoded instructions that have been respectively allocated to the at least two instruction executing circuitries, an instruction executing circuitry to schedule the instruction for execution.

For example, for the arithmetic operation instructions to be allocated to an ALU for execution, it may be determined, according to the difference between the arithmetic operation instructions that have been currently allocated to ALU 152A and ALU 152B, to which of ALU 152A and ALU 152B the newly decoded arithmetic operation instruction is allocated for execution.

In some embodiments, the newly decoded arithmetic operation instruction can be allocated to an executing circuitry that has been allocated with fewer instructions to be executed. For example, if ALU 152A is currently allocated with 3 instructions to be executed, and ALU 152B is allocated with 1 instruction to be executed, a new decoded instruction may be allocated to ALU 152B for execution.

In some embodiments, different executing circuitries 150 may have different priorities. For example, executing circuitry 150 with a higher priority can occupy processing resources with priority. As a result, executing circuitry 150 with a higher priority can have a faster instruction execution speed. Accordingly, higher-priority executing circuitry 150 can be allocated with more instructions to execute and can fully utilize processor resources. However, if too many instructions are allocated to higher-priority executing circuitry 150, executing circuitry 150 can be in a busy state for a prolonged period, and lower-priority executing circuitry 150 can be left in an idle state, hence reducing the processing efficiency.

In some embodiments, the influence of the priority of the executing circuitry on the instruction allocation may be taken into account in the system. For example, if a difference between the number of instructions that have been allocated to the higher-priority instruction executing circuitry and the number of instructions that have been allocated to the lower-priority instruction executing circuitry is smaller than a predetermined threshold (e.g., when the number of instructions allocated to the higher-priority instruction executing circuitry does not exceed the number of instructions allocated to the lower-priority instruction executing circuitry by a great margin), the new decoded instruction can be allocated to the higher-priority instruction executing circuitry. As a result, if the difference between the number of instructions that have been allocated to the higher-priority instruction executing circuitry and the number of instructions that have been allocated to the lower-priority instruction executing circuitry is not smaller than the predetermined threshold, (e.g., when the number of instructions allocated to the higher-priority instruction executing circuitry is much greater than the number of instructions allocated to the lower-priority instruction executing circuitry), the new decoded instruction can be allocated to the lower-priority instruction executing circuitry. Therefore, the higher-priority instruction executing circuitry can be allocated with more instructions for execution without causing too much difference in load between the two instruction executing circuitries with different priorities, thus keeping the load balance between the two.

In some embodiments, using ALUs 152A and 152B of FIG. 2 as an example, assuming that the priority of ALU 152A is higher than the priority of ALU 152B, the numbers of instructions that have been allocated to the two executing circuitries are calculated first, such as using functions Schedule_Inst_Num (ALU 152A) and Schedule_Inst_Num (ALU 152B). A difference X between the two can be determined:

$$X=\text{Schedule\_Inst\_Num}(\text{ALU }152A)-\text{Schedule\_Inst\_Num}(\text{ALU }152B)$$

The difference X can then be compared with a threshold Xth to determine whether a threshold condition has occurred. As an example of one threshold condition, if X is smaller than Xth, the number of instructions allocated to the higher-priority ALU 152A for execution may not be much greater than the number of instructions allocated to the lower-priority ALU 152B for execution. Therefore, the new decoded instruction is allocated to the higher-priority ALU 152A. If X is larger than or equal to Xth, the higher-priority ALU 152A may have many instructions to execute, so the new decoded instruction can be allocated to the lower-priority ALU 152B.

In some embodiments, in scheduling logic 169, the instruction executing circuitry to which the new decoded instruction is to be allocated can be determined according to the numbers of instructions that have been allocated to various instruction executing circuitries 150 in instruction scheduling unit 160, As a result, pipeline performance loss can be reduced. For example, for those instructions that wait in a queue as a higher-priority instruction executing circuitry has too many instructions to execute while a lower-priority instruction executing circuitry is in an idle state, these instructions can be allocated to the lower-priority instruction executing circuitry, hence effectively promoting load balancing among the instruction executing circuitries.

In some embodiments, in scheduling logic 169, the number of instructions being executed in each instruction executing circuitry 150 may also be considered. For example, the number of instructions can be the sum of the number of instructions that have been allocated to executing circuitry 150 in instruction scheduling circuitry 160 and the number of instructions being executed in executing circuitry 150.

In some embodiments, for ALUs 152A and 152B described above, the number of instructions being executed in ALU 152A may be determined using a function Execute_Inst_Num (ALU 152A), and the number of instructions being executed in ALU 152B may be determined using a function Execute_Inst_Num (ALU 152B). Therefore, the value of X may be expressed as:

$$X=(\text{Execute\_Inst\_Num}(\text{ALU }152A)+\text{Schedule\_Inst\_Num}(\text{ALU }152A))-(\text{Execute\_Inst\_Num}(\text{ALU }152B)+\text{Schedule\_Inst\_Num}(\text{ALU }152B))$$

where the value of X is compared with the threshold Xth to determine to which instruction executing circuitry 150 the new decoded instruction can be allocated.

By further considering the number of instructions being executed in each instruction executing circuitry 150, scheduling logic 169 can further evaluate the instruction load, so that the load on each executing circuitry 150 can be more balanced.

In some embodiments, in instruction scheduling circuitry 160, there can be a plurality of ways to obtain the number of instructions that have been allocated to each instruction executing circuitry 150. For example, for first instruction scheduling sub-circuitries 164A and 164B shown in FIG. 2, counters (e.g., in a form of registers) may be set in these scheduling sub-circuitries, and the numbers of instructions that have been allocated to corresponding instruction executing circuitries 150 can be stored in the counters. Therefore, the numbers of instructions that have been allocated to one or more instruction executing circuitries can be obtained from these counters. In some embodiments, a special counter may be provided in instruction scheduling circuitry 160 to store the number of instructions that have been allocated for each instruction executing circuitry 150.

In some embodiments, for a decoded instruction, an effective flag bit can be added for the instruction in instruction scheduling circuitry 160 to indicate an execution status of the instruction. For example, when a value of the flag bit is 1, the instruction has been allocated and has not been executed. When the value of the flag bit is 0, the instruction has been executed or has not been allocated. As a result, by counting the effective flag bits of all instructions in instruction scheduling circuitry 160 or instruction executing circuitry 150, the number of instructions allocated to each instruction executing circuitry 150 or instructions that have been executed in instruction executing circuitry 150 can be obtained.

In some embodiments, the priority of each instruction executing circuitry can be dynamically modified to determine to which instruction executing circuitry a newly decoded instruction can be allocated. For example, for a certain type of instruction, the newly decoded instruction can be allocated to the instruction executing circuitry with a higher priority for execution. Therefore, in scheduling logic 169, after determining to which instruction executing circuitry 150 the instruction is to be allocated, the priority of the determined instruction executing circuitry 150 may be modified to allocate the instruction for execution. This method has an advantage that redesign of an existing pipeline is not needed. As a result, this method can be conveniently applied to an existing processor pipeline.

Figure 3:
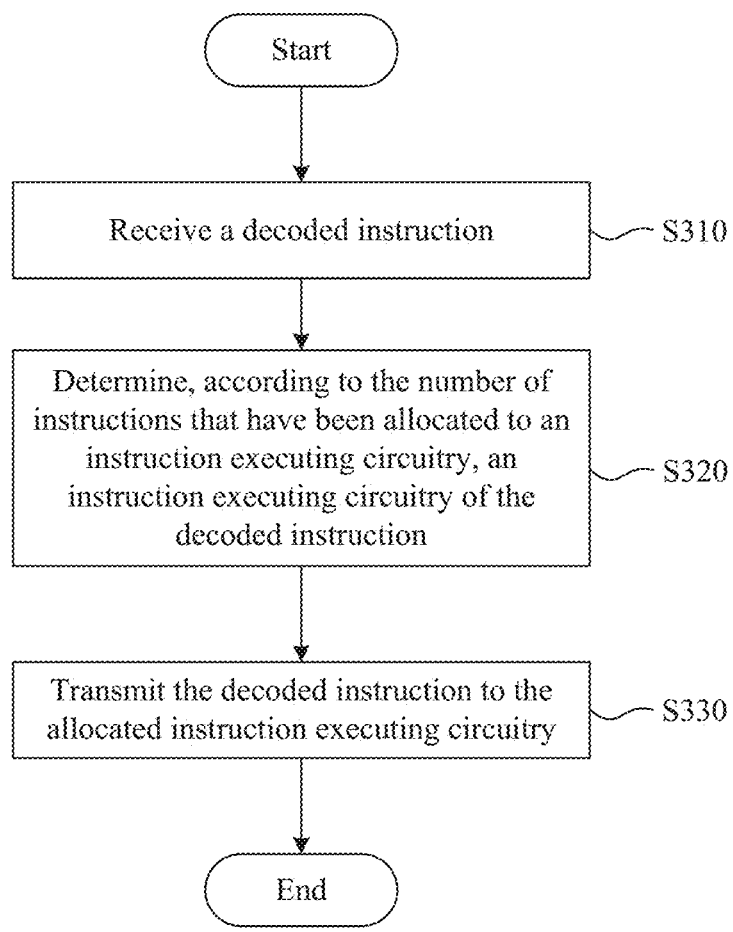
FIG. 3 is an example flowchart of an instruction scheduling method, according to some embodiments of the present disclosure.

FIG. 3 is an example flowchart of an instruction scheduling method, according to some embodiments of the present disclosure. It is appreciated that method 300 in FIG. 3 can be executed by instruction scheduling circuitry 160 in instruction processing apparatus 100 shown in FIG. 1 or FIG. 2.

In step S310, a decoded instruction is received. The instruction may be decoded by, for example, an instruction decoding circuitry (e.g., instruction decoding circuitry 140 of FIG. 1). In some embodiments, the instruction decoding circuitry can be upstream of the instruction processing pipeline. Each decoded instruction can include information that can identify the instruction, such as an instruction PC value.

In step S320, an instruction executing circuitry (e.g., instruction executing circuitry 150 of FIG. 1 or FIG. 2) that is scheduled to execute the decoded instruction is determined according to an instruction type or the number of instructions that have been allocated to each instruction executing circuitry in a plurality of instruction executing circuitries. The decoded instruction is allocated to the determined instruction executing circuitry. In some embodiments, the instructions may include arithmetic operation instructions, vector floating point calculation instructions, conditional jump or unconditional jump instructions, data storage and load instructions, etc. In some embodiments, instruction executing circuitry has a plurality of executing circuitries, such as two ALUs (e.g., ALUs 152A and 152B of FIG. 2), a branch jump circuitry (e.g., branch jump circuitry 154 of FIG. 2), a load storage circuitry (load storage circuitry 156 of FIG. 2), or two vector operation circuitries (e.g., vector operation circuitries 158A and 158B of FIG. 2). The ALUs can be configured to execute arithmetic operation instructions. The branch jump circuitry can be configured to perform conditional jump or unconditional jump instructions. The load storage circuitry can be configured to execute data storage and load instructions. The vector operation circuitries can be configured to execute vector floating point calculation instructions.

In some embodiments, whether the instructions are of the same type can be determined according to whether the instructions are executed by executing circuitries 150 of the same type. As a result, some instructions that are not of the same type but executed by executing circuitries 150 of the same type can be considered as instructions of the same type.

In some embodiments, for at least two instruction executing circuitries of the plurality of instruction executing circuitries 150 that execute instructions of the same type, in step S320, an instruction executing circuitry that is scheduled to execute the decoded instruction can be determined according to the difference between numbers of decoded instructions that have been respectively allocated to the at least two instruction executing circuitries. For example, for the arithmetic operation instructions that are allocated to ALUs for execution, it may be determined, according to the difference between the arithmetic operation instructions that have been currently allocated to ALU 152A and ALU 152B, to which of ALU 152A and ALU 152B the newly decoded arithmetic operation instruction can be allocated for execution.

In some embodiments, the newly decoded arithmetic operation instruction can be allocated to an executing circuitry that has been allocated with fewer instructions to execute. For example, if ALU 152A is currently allocated with 3 instructions to execute, and ALU 152B is allocated with 1 instruction to execute, a new decoded instruction can be allocated to ALU 152B for execution.

In some embodiments, different executing circuitries 150 may have different priorities. For example, executing circuitry 150 with a higher priority can occupy more processing resources. As a result, executing circuitry 150 with a higher priority can provide a faster instruction execution speed. Based on this, higher-priority executing circuitry 150 can be allocated more instructions to execute and can fully utilize processor resources. However, if too many instructions are allocated to higher-priority executing circuitry 150, executing circuitry 150 can be kept in a busy state, and lower-priority executing circuitry 150 can be left in an idle state, thus the processing efficiency is reduced.

In some embodiments, in step S320, for the higher-priority instruction executing circuitry and the lower-priority instruction executing circuitry, if a difference between the number of instructions that have been allocated to the higher-priority instruction executing circuitry and the number of instructions that have been allocated to the low-priority instruction executing circuitry is smaller than a predetermined threshold, (e.g., when the number of instructions allocated to the higher-priority instruction executing circuitry does not exceed the number of instructions allocated to the lower-priority instruction executing circuitry by a great margin), the newly decoded instruction can be allocated to the higher-priority instruction executing circuitry. Accordingly, if the difference between the number of instructions that have been allocated to the higher-priority instruction executing circuitry and the number of instructions that have been allocated to the lower-priority instruction executing circuitry is not smaller than the predetermined threshold, (e.g., when the number of instructions allocated to the higher-priority instruction executing circuitry is much greater than the number of instructions allocated to the lower-priority instruction executing circuitry), the newly decoded instruction can be allocated to the lower-instruction executing circuitry. As a result, the higher-priority instruction executing circuitry can be allocated with more instructions for execution without causing too much difference in load between two instruction executing circuitries with different priorities, thus keeping the load balance between the two.

In step S330, the decoded instruction is transmitted to the allocated instruction executing circuitry for execution. In some embodiments, the instruction is exited after the execution is completed. In some embodiments, the instructions are transmitted to one or more instruction executing circuitries out of order. The instructions are sequentially exited after the execution is completed, hence completing the processing of the instructions in the instruction processing apparatus.

According to method 300, the instruction executing circuitry to which a new decoded instruction is to be allocated can be determined according to the numbers of instructions that have been allocated to different instruction executing circuitries 150. As a result, pipeline performance loss can be effectively reduced. For example, for those instructions that wait in a queue as a higher-priority instruction executing circuitry has too many instructions to be executed while a lower-priority instruction executing circuitry is in an idle state, these instructions can be allocated to the lower-priority instruction executing circuitry, hence effectively promoting load balancing among the instruction executing circuitries.

In some embodiments, in step S320, the number of instructions being executed in each instruction executing circuitry 150 may also be considered. For example, the number of instructions can be the sum of the number of instructions that have been allocated to executing circuitry 150 in instruction scheduling circuitry 160 and the number of instructions being executed in executing circuitry 150.

In some embodiments, by further considering the number of instructions being executed in each instruction executing circuitry 150, the load on each executing circuitry 150 can be more balanced.

In some embodiments, instruction scheduling circuitry 160 includes two instruction scheduling structures. In some embodiments, the difference between the two structures is that, in the first instruction scheduling structure, the scheduling sub-circuitry maintains a list of scheduled instructions associated with a corresponding executing circuitry (e.g., maintains a corresponding instruction transmission queue). In the second instruction scheduling structure, the scheduling sub-circuitry maintains a list of scheduled instructions for all corresponding executing circuitries. The two structures can better adapt to more types of executing circuitries.

In some embodiments, corresponding steps in method 300 can also be performed in different sub-circuitries. For example, for the first instruction scheduling structure, the process of determining the instruction executing circuitry in step S320 may be performed in first scheduling logic sub-circuitry 162. The instruction executing circuitry that is scheduled to execute the decoded instruction can be determined according to the difference between the numbers of decoded instructions that have been respectively allocated to the two or more instruction executing circuitries, and the decoded instruction is allocated to first instruction scheduling sub-circuitry 164A or 164B corresponding to the determined instruction executing circuitry. In some embodiments, step S330 can be performed in each first instruction scheduling sub-circuitry 164A or 164B. The decoded instruction allocated to the corresponding instruction executing circuitry can be received, and the decoded instruction can be transmitted to the corresponding instruction executing circuitry for execution.

In some embodiments, for the second instruction scheduling structure, determining the instruction executing circuitry in step S320 may be performed in second scheduling logic sub-circuitry 168. An instruction executing circuitry that is scheduled to execute the decoded instruction can be determined according to the difference between numbers of decoded instructions that have been respectively allocated to the two or more instruction executing circuitries. In some embodiments, in step S330, the decoded instruction can be transmitted by the second instruction scheduling sub-circuitry to the determined instruction executing circuitry for execution.

In some embodiments, the instruction processing apparatus according to the present disclosure may be implemented as a processor core, and the instruction processing method (e.g., method 300 of FIG. 3) may be executed in the processor core. The processor core may be implemented in different processors or in different manners. For example, the processor core may be implemented as a general ordered core for general computing, a high-performance general unordered core for general computing, or a dedicated core for graphics and/or scientific (throughput) computing. The processor may be implemented as a Central Processing Unit ("CPU") or co-processor, where the CPU may include one or more general ordered cores or one or more general unordered cores, and the coprocessor may include one or more dedicated cores. Such a combination of different processors may lead to different computer system architectures. In some embodiments, the coprocessor can be located on a chip, separate from the CPU. In some embodiments, the coprocessor can be located in the same package as the CPU, but on a separate die. In some embodiments, the coprocessor can be located on the same die as the CPU. Such a coprocessor can sometimes be referred to as dedicated logic (e.g., integrated graphics or scientific (throughput) logic), or referred to as a dedicated core. In some embodiments, the described CPU (sometimes referred to as an application core or application processor), the coprocessor described above, and additional functions may be included on the same die.

Figure 4:
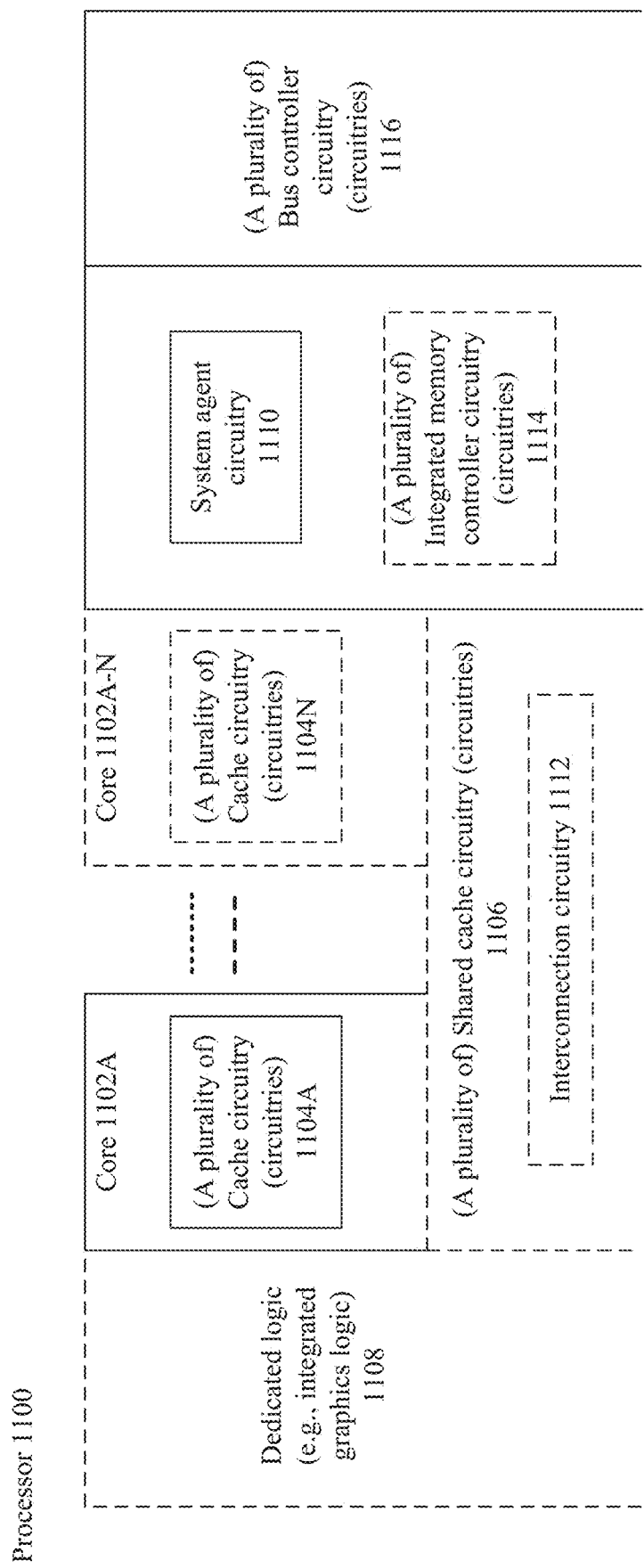
FIG. 4 is an example schematic diagram of a processor, according to some embodiments of the present disclosure.

FIG. 4 is an example schematic diagram of a processor, according to some embodiments of the present disclosure. As shown in FIG. 4, processor 1100 can include a single core 1102A, a system agent circuitry 1110, and one or more bus controller circuitries 1116. In some embodiments, processor 1100 can further include a plurality of cores 1102A-N, an integrated memory controller circuitry 1114 in a system agent circuitry 1110, and a dedicated logic 1108.

In some embodiments, processor 1100 may be implemented as a CPU. Dedicated logic 1108 can be the integrated graphics or scientific (throughput) logic, which may include one or more cores. Cores 1102A-N can be one or more general cores (e.g., a general ordered core, a general unordered core, or a combination of both).

In some embodiments, processor 1100 may be implemented as a coprocessor. Cores 1102A-N can be a plurality of dedicated cores for graphics or scientific (throughput) logic. In some embodiments, processor 1100 may be implemented as a coprocessor, where cores 1102A-N can be a plurality of general ordered cores. As a result, processor 1100 may be a general processor, a coprocessor, or a dedicated processor. For example, processor 1100 can be a network or communication processor, a compression engine, a graphics processor, a general-purpose graphics processing unit ("GPGPU"), a high-throughput many integrated core ("MIC") coprocessor (e.g., including 30 or more cores), or an embedded processor. In some embodiments, the processor may be implemented on one or more chips. Processor 1100 may be a part of one or more substrates, or may be implemented on the one or more substrates using any of the techniques such as, for example, Bipolar CMOS ("BiCMOS"), CMOS, or NMOS.

In some embodiments, a memory hierarchical structure includes one or more levels of cache within each core, one or more shared cache circuitries 1106, or an external memory (not shown on FIG. 4) coupled to integrated memory controller circuitry 1114. Shared cache circuitry 1106 may include one or more intermediate level caches, such as level 2 ("L2"), level 3 ("L3"), level 4 ("L4") or other levels of cache, last level cache ("LLC"), or combinations thereof. In some embodiments, interconnection circuitry 1112 can be a ring connection that connects integrated graphics logic 1108, shared cache circuitry 1106, system agent circuitry 1110, and integrated memory controller circuitry 1114. In some embodiments, interconnection circuitry 1112 can be other types of interconnection.

System agent 1110 can include components that coordinate and operate cores 1102A-N. For example, system agent circuitry 1110 can include a power control circuitry ("PCU") and a display circuitry. The PCU may include logic and components that are needed to adjust power states of cores 1102A-N and integrated graphics logic 1108. The display circuitry can be configured to drive one or more externally connected displays.

In some embodiments, cores 1102A-N may have the core architecture described above with reference to FIG. 1 and may be homogeneous or heterogeneous in terms of architectural instruction set. In other words, two or more cores 1102A-N may be able to execute the same instruction set, while other cores may be able to execute only a subset of the instruction set or a different instruction set.

Figure 5:
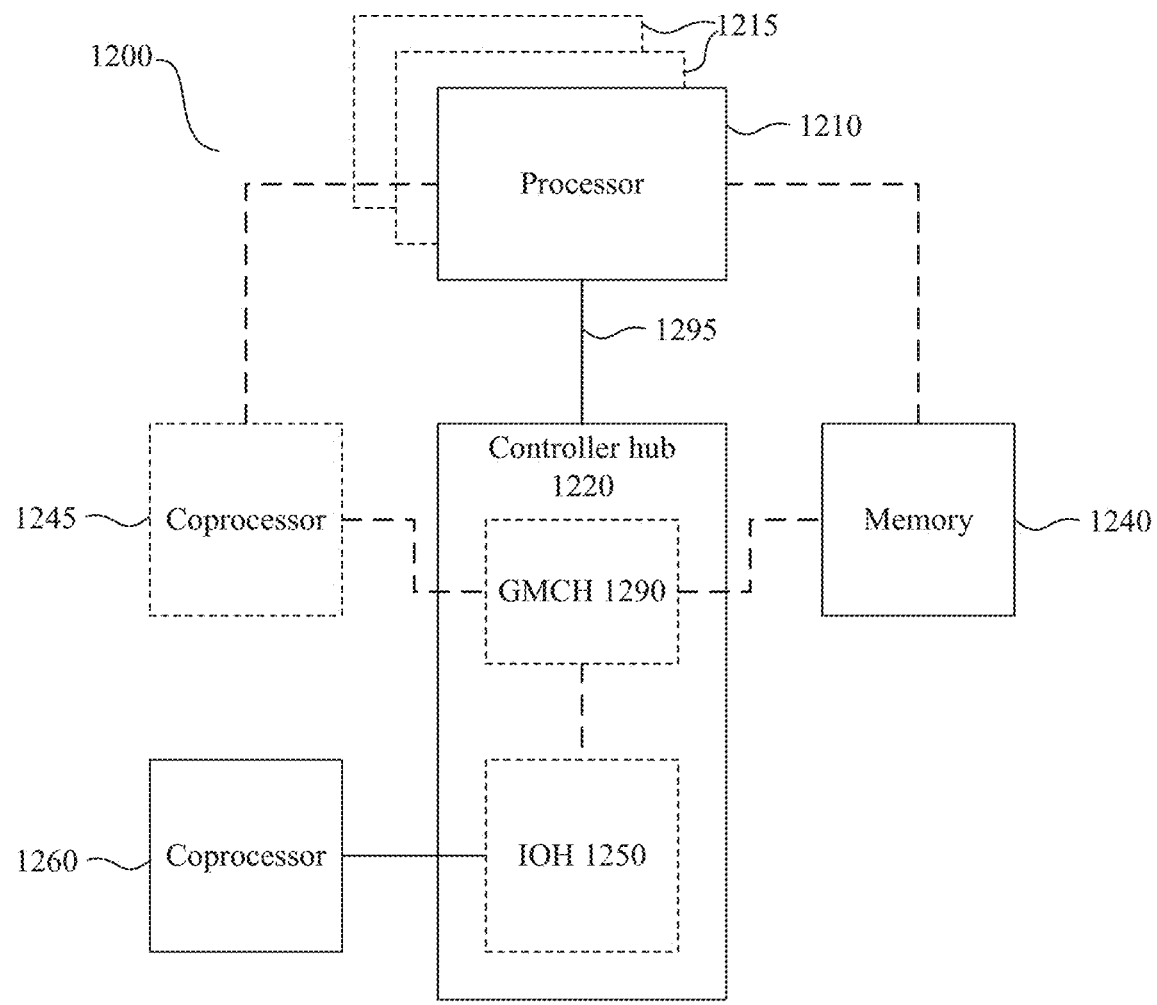
FIG. 5 is an example schematic diagram of a computer system, according to some embodiments of the present disclosure.

FIG. 5 is an example schematic diagram of a computer system, according to some embodiments of the present disclosure. Computer system 1200 shown in FIG. 5 may be applied to a laptop device, a desktop computer, a handheld PC, a personal digital assistant, an engineering workstation, a server, a network device, a network hub, a switch, an embedded processor, a digital signal processor (DSP), a graphic device, a video game device, a set-top box, a microcontroller, a cellular phone, a portable media player, a handheld device, or other electronic devices.

As shown in FIG. 5, system 1200 may include one or more processors 1210 and 1215. These processors can be communicatively coupled with controller hub 1220. In some embodiments, controller hub 1220 can include graphics memory controller hub ("GMCH") 1290 or input/output hub ("IOH") 1250. In some embodiments, GMCH and IOH may be located on separate chips. GMCH 1290 can include a memory controller and a graphics controller coupled to memory 1240 and coprocessor 1245. IOH 1250 can communicatively couple input/output ("I/O") device 1260 to GMCH 1290. In some embodiments, the memory controller and the graphics controller can be integrated in the processor (e.g., processor 1210 or processors 1215), so that memory 1240 and coprocessor 1245 can be directly coupled to processor 1210. As a result, controller hub 1220 may include IOH 1250 and not GMCH 1290.

In some embodiments, processor 1210 or processors 1215 may include one or more of the processing cores described above (e.g., processor 1100 shown in FIG. 4).

Memory 1240 may be, for example, a dynamic random access memory ("DRAM"), a phase change memory ("PCM"), or a combination of both. In some embodiments, controller hub 1220 can be connected via a multi-drop bus such as a front side bus ("FSB"), a point-to-point interface such as quick path interconnect ("QPI"), or a similar connection 1295 to communicate with processor 1210 or processors 1215.

In some embodiments, coprocessor 1245 can be a dedicated processor (e.g., a high-throughput MIC processor, a network or communication processor, a compression engine, a graphics processor, a GPGPU, or an embedded processor). In some embodiments, controller hub 1220 may include an integrated graphics accelerator.

In some embodiments, processor 1210 can execute instructions that control data processing operations of general types, coprocessor instructions may be embedded in these instructions. Processor 1210 can identify these coprocessor instructions as having the type that should be executed by the communicatively coupled coprocessor 1245. As a result, processor 1210 can issue these coprocessor instructions (or control signals representing coprocessor instructions) to coprocessor 1245 on the coprocessor bus or another interconnect. Coprocessor 1245 can accept or execute the received coprocessor instructions.

Figure 6:
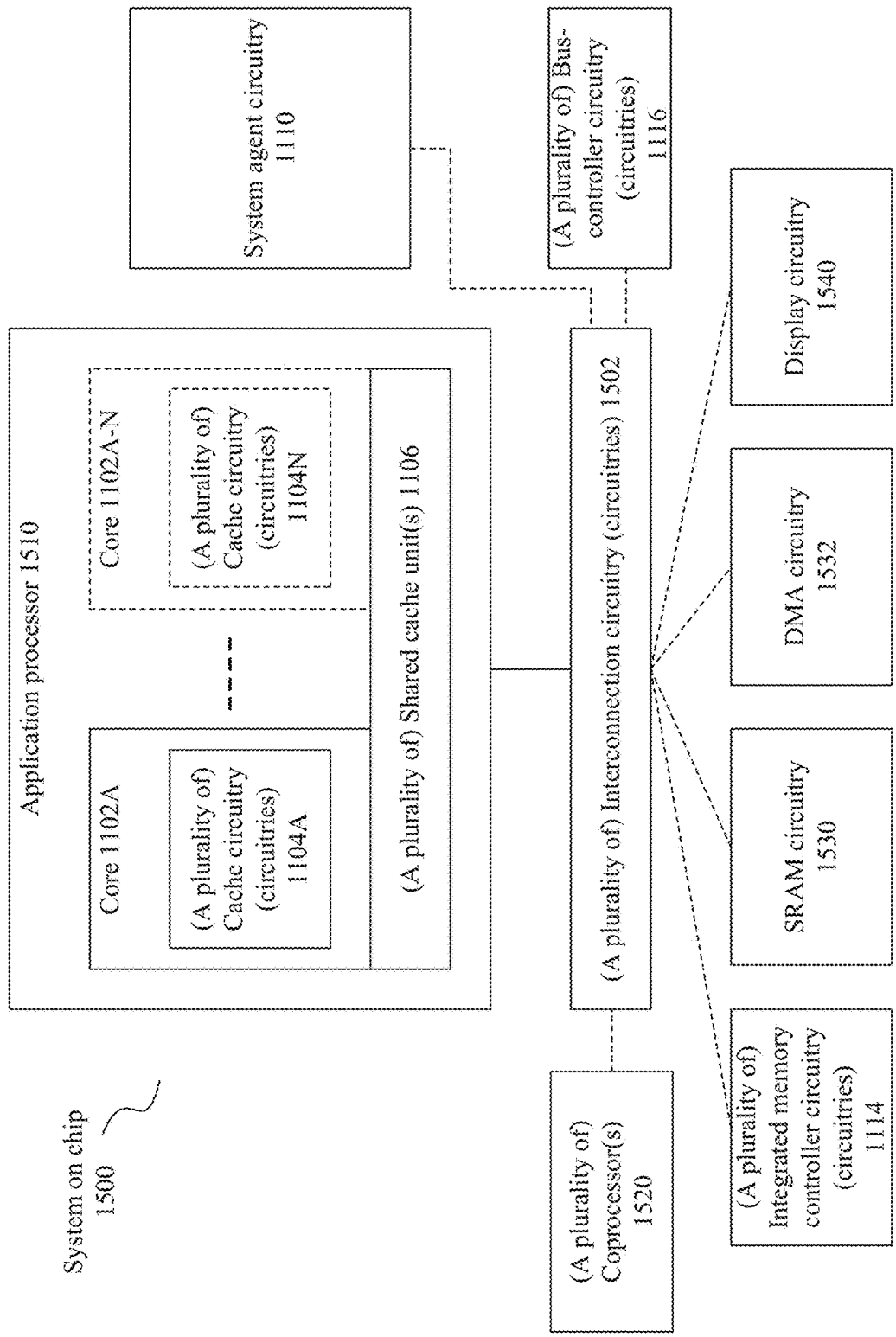
FIG. 6 is an example schematic diagram of system on chip, according to some embodiments of the present disclosure.

FIG. 6 is an example schematic diagram of system on chip, according to some embodiments of the present disclosure. The system on chip shown in FIG. 6 includes processor 1100 (e.g., processor 1100 shown in FIG. 4). As shown in FIG. 6, interconnection circuitry 1502 can be communicatively coupled to application processor 1510, system agent circuitry 1110, bus controller circuitry 1116, integrated memory controller circuitry 1114, one or more coprocessors 1520, static random access memory ("SRAM") circuitry 1530, direct memory access ("DMA") circuitry 1532, or display circuitry 1540. Display circuitry 1540 can be configured to be communicatively coupled to one or more external displays. Application processor 1510 can include a set of one or more cores 1102A-N and shared cache circuitry 1106. Coprocessor 1520 can include integrated graphics logic, an image processor, an audio processor, or a video processor. In some embodiments, coprocessor 1520 can include a dedicated processor, such as a network or communication processor, a compression engine, a GPGPU, a high-throughput MIC processor, or an embedded processor.

In some embodiments, the system on chip described above may be included in an intelligent device in order to realize corresponding functions in the intelligent device, such as executing related control programs, performing data analysis, performing operation and processing, conducting network communication, or controlling peripheral devices in the intelligent device.

Such intelligent devices can include specialized intelligent devices, such as mobile terminals and personal digital terminals. These devices can include one or more systems on chip according to the present disclosure to perform data processing or control peripheral devices in the device.

In some embodiments, such intelligent devices can also include dedicated devices constructed to achieve specific functions, such as intelligent speakers or intelligent display devices. These devices include the system on chip (e.g., system on chip 1500 of FIG. 6) to control the speaker and the display device, therefore providing the speaker and the display device additional functions such as communication, perception, and data processing.

In some embodiments, such intelligent devices can also include various internet of things ("IoT") devices or internet of things with artificial intelligence ("AoT") devices. These devices can include the system on chip (e.g., system on chip 1500 of FIG. 6) to provide additional functions such as performing AI operations, data communication and transmission, etc. As a result, the system on chip can help the intelligent devices to achieve a denser and more intelligent device distribution.

In some embodiments, such intelligent devices can also be used in vehicles. For example, the intelligent devices may be implemented as an in-vehicle device or may be embedded in vehicles to provide data processing capabilities for intelligent driving of the vehicles.

In some embodiments, such intelligent devices may also be used in home and entertainment fields. For example, the intelligent devices may be implemented as intelligent speakers, intelligent air conditioners, intelligent refrigerators, intelligent display devices, etc. These devices can include the system on chip (e.g., system on chip of FIG. 6) for data processing and peripheral control, hence realizing intelligentization of home and entertainment devices.

In some embodiments, such intelligent devices can also be used in industrial fields. For example, the intelligent devices may be implemented as industrial control devices, sensing devices, IoT devices, AIoT devices, or braking devices. These devices can include the system on chip (e.g., system on chip of FIG. 6) for data processing and peripheral control, hence realizing intelligentization of industrial equipment.

According the present disclosure, an executing circuitry for a next instruction can be determined according to the number of decoded instructions that have been allocated to each instruction executing circuitry, which can effectively avoid the pipeline performance loss caused by the fact that instructions wait in a queue as a high-priority instruction executing circuitry has too many instructions to be executed while a low-priority instruction executing circuitry is in an idle state, and effectively promote load balancing among a plurality of instruction executing circuitries.

In addition to considering the number of instructions that have been allocated to the instruction executing circuitry in the instruction scheduling circuitry, the number of instructions that have been executed in each instruction executing circuitry can also be considered, thereby achieving more balanced load for each instruction executing circuitry.

In addition, at least two different instruction scheduling structure designs are presented in consideration of characteristics of different instruction types and instruction executing circuitries. For example, in some designs, a special instruction scheduling sub-circuitry is allocated for each instruction executing circuitry, and after an instruction executing circuitry is determined for a decoded instruction according to load balancing, the instruction is sent to the special instruction scheduling sub-circuitry, so that in the instruction scheduling sub-circuitry, attention is paid to the ordering and transmitting of instructions, which simplifies the structural design of load balancing scheduling. In some designs, one instruction scheduling sub-circuitry corresponds to a plurality of instruction executing circuitries. Therefore, load balancing logic is embedded in the instruction scheduling sub-circuitry, and instruction transmission to the instruction executing circuitries is centrally managed. By providing the at least two designs, load balancing scheduling can be better provided for various types of instructions and instruction executing circuitries.

The embodiments may further be described using the following clauses:

1. An apparatus, comprising:
   one or more instruction executing circuitries, wherein each instruction executing circuitry of the one or more instruction executing circuitries is configured to execute an instruction of a corresponding instruction type, and
   an instruction scheduling circuitry that is communicatively coupled to the one or more instruction executing circuitries, the instruction scheduling circuitry is configured to:
      determine, according to an instruction type of the instruction and a number of instructions that have been allocated to the one or more instruction executing circuitries, an instruction executing circuitry from the one or more instruction executing circuitries to schedule the instruction for execution, and
      allocate the instruction to the determined instruction executing circuitry.

2. The apparatus of clause 1, further comprising:
   an instruction decoding circuitry configured to decode the instruction, wherein the instruction decoding circuitry is communicatively coupled to the instruction scheduling circuitry, and the instruction decoding circuitry is further configured to send the decoded instruction to the instruction scheduling circuitry.

3. The apparatus of clause 1 or 2, wherein:
   the one or more instruction executing circuitries comprise at least two instruction executing circuitries;
   the at least two instruction executing circuitries are configured to execute instructions of a same instruction type; and
   the instruction scheduling circuitry is further configured to determine, according to a difference between numbers of instructions allocated to each of the at least two instruction executing circuitries, the instruction executing circuitry to schedule the instruction for execution.

4. The apparatus of clause 3, wherein:
   the at least two instruction executing circuitries comprise a first instruction executing circuitry having a first priority and a second instruction executing circuitry having a second priority, wherein the first priority is higher than the second priority; and
   the instruction scheduling circuitry is further configured to:
      allocate the instruction to the first instruction executing circuitry in response to the difference between the number of instructions allocated to the first instruction executing circuitry and the number of instructions allocated to the second instruction executing circuitry is smaller than a predetermined threshold; and
      allocate the instruction to the second instruction executing circuitry in response to the difference between the numbers of instructions is not smaller than the predetermined threshold.

5. The apparatus of clause 3 or 4, wherein the instruction scheduling circuitry comprises:
   at least two first instruction scheduling sub-circuitries, wherein:
      each of the first instruction scheduling sub-circuitries is communicatively coupled to a corresponding instruction executing circuitry in the at least two instruction executing circuitries, and
      each of the first instruction scheduling sub-circuitries is configured to receive the instruction allocated to the corresponding instruction executing circuitry and transmit the instruction to the corresponding instruction executing circuitry for execution; and a first scheduling logic sub-circuitry communicatively coupled to the at least two first instruction scheduling sub-circuitries, wherein:

the first scheduling logic sub-circuitry is configured to determine, according to a difference between the numbers of instructions that have been allocated to each of the at least two instruction executing circuitries, the instruction executing circuitry to schedule the instruction for execution, and allocate the instruction to a first instruction scheduling sub-circuitry that corresponds to the determined instruction executing circuitry.

6. The apparatus of any one of clauses 3 to 5, wherein:
the instruction scheduling circuitry further comprises a second instruction scheduling sub-circuitry communicatively coupled to the at least two instruction executing circuitries; and the second scheduling sub-circuitry comprises:

a second scheduling logic sub-circuitry configured to determine, according to the difference between the numbers of decoded instructions that have been allocated to each of the at least two instruction executing circuitries, the instruction executing circuitry to schedule the instruction for execution, and transmit the instruction to the determined instruction executing circuitry.

7. The apparatus of any one of clauses 1 to 6, wherein the instructions that have been allocated to the instruction executing circuitry comprise an instruction that has been allocated and has not yet been executed in the instruction scheduling circuitry, and an instruction being executed in the instruction executing circuitry.

8. The apparatus of any one of clauses 1 to 7, wherein the instruction scheduling circuitry further comprises an instruction counter, wherein the instruction counter is configured to store the number of instructions allocated to each of the one or more instruction executing circuitries.

9. The apparatus of any one of clauses 1 to 8, wherein:
the instruction comprises an instruction identifier indicating an execution state of the instruction; and the instruction scheduling circuitry is further configured to:

count a number of instructions in which the instruction identifiers indicate incomplete execution in the instructions allocated to each instruction executing circuitry, and determine the number of instructions allocated to each instruction executing circuitry.

10. A method, comprising:
receiving an instruction:

determining, according to an instruction type of the instruction and a number of instructions that have been allocated to one or more instruction executing circuitries, an instruction executing circuitry from the one or more instruction executing circuitries to schedule the instruction for execution;

allocating the instruction to the determined instruction executing circuitry; and transmitting the instruction to the allocated instruction executing circuitry for execution.

11. The method of clause 10, wherein:
the one or more instruction executing circuitries comprise at least two instruction executing circuitries;

the at least two instruction executing circuitries are configured to execute instructions of a same instruction type; and wherein determining the instruction executing circuitry from the one or more instruction executing circuitry further comprises:

determining, according to a difference between numbers of instructions allocated to each of the at least two instruction executing circuitries, the instruction executing circuitry to schedule the instruction for execution.

12. The method of clause 10, wherein:
the at least two instruction executing circuitries comprise a first instruction executing circuitry having a first priority and a second instruction executing circuitry having a second priority, wherein the first priority is higher than the second priority; and wherein determining the instruction executing circuitry from the one or more instruction executing circuitries further comprises:

allocating the instruction to the first instruction executing circuitry in response to the difference between the number of instructions allocated to the first instruction executing circuitry and the number of instructions allocated to the second instruction executing circuitry is smaller than a predetermined threshold, and allocating the instruction to the second instruction executing circuitry in response to the difference between the numbers of instructions is not smaller than the predetermined threshold.

13. The method of clause 11 or 12, wherein:
the instruction scheduling circuitry comprises:

at least two first instruction scheduling sub-circuitries, wherein each of the first instruction scheduling sub-circuitries is communicatively coupled to a corresponding instruction executing circuitry in the at least two instruction executing circuitries, and a first scheduling logic sub-circuitry communicatively coupled to the at least two first instruction scheduling sub-circuitries; and wherein determining the instruction executing circuitry from the one or more instruction executing circuitries further comprises:

in the first scheduling logic sub-circuitry, determining, according to a difference between the numbers of instructions that have been allocated to each of the at least two instruction executing circuitries, the instruction executing circuitry to schedule the instruction for execution, allocating the instruction to the first instruction scheduling sub-circuitry that corresponds to the determined instruction executing circuitry, in each of the first instruction scheduling sub-circuitries, receiving the instruction allocated to the corresponding instruction executing circuitry, and in each of the first instruction scheduling sub-circuitries, transmitting the instruction to the corresponding instruction executing circuitry for execution.

14. The method of any one of clauses 11 to 13, wherein:
the instruction scheduling circuitry comprises a second instruction scheduling sub-circuitry communicatively coupled to the at least two instruction executing circuitries, the second instruction scheduling sub-circuitry comprising a second scheduling logic sub-circuitry; and wherein determining the instruction executing circuitry from the one or more instruction executing circuitries further comprises:

in the second scheduling logic sub-circuitry, determining, according to the difference between the numbers of instructions that have been allocated to each of the at least two instruction executing circuitries, the instruction executing circuitry to schedule to execute the instruction, and transmitting the instruction to the determined instruction executing circuitry by the second instruction scheduling sub-circuitry to execute the instruction.

15. The method of any one of clauses 10 to 14, wherein the instructions that have been allocated to the instruction executing circuitry comprise an instruction that has been currently allocated and has not yet been executed and an instruction being executed in the instruction executing circuitry.

16. The method of any one of clauses 10 to 15, further comprising obtaining, from an instruction counter, the number of instructions allocated to each instruction executing circuitry.

17. The method of any one of clauses 10 to 16, wherein:

the instruction comprises an instruction identifier indicating an execution state of the instruction; and the method further comprises:
counting a number of instructions in which the instruction identifiers indicate incomplete execution in the instructions allocated to each instruction executing circuitry, and determining the number of instructions allocated to each instruction executing circuitry.

18. A system on chip, comprising:
an instruction processing apparatus, comprising:
one or more instruction executing circuitries, wherein each instruction executing circuitry of the one or more instruction executing circuitries is configured to execute an instruction of a corresponding instruction type, and an instruction scheduling circuitry that is communicatively coupled to the one or more instruction executing circuitries, the instruction scheduling circuitry is configured to:

determine, according to an instruction type of the instruction and a number of instructions that have been allocated to the one or more instruction executing circuitries, an instruction executing circuitry from the one or more instruction executing circuitries to schedule the instruction for execution, and allocate the instruction to the determined instruction executing circuitry to transmit the instruction to the allocated instruction executing circuitry for execution.

19. An intelligent device, comprising:
a system on chip, comprising:
an instruction processing apparatus, comprising:
one or more instruction executing circuitries, wherein each instruction executing circuitry of the one or more instruction executing circuitries is configured to execute an instruction of a corresponding instruction type, and an instruction scheduling circuitry that is coupled to the one or more instruction executing circuitries, the instruction scheduling circuitry is configured to:

determine, according to an instruction type of the instruction and a number of instructions that have been allocated to the one or more instruction executing circuitries, an instruction executing circuitry from the one or more instruction executing circuitries to schedule the instruction for execution, and allocate the instruction to the determined instruction executing circuitry to transmit the instruction to the allocated instruction executing circuitry for execution.

20. A non-transitory computer readable medium that stores a set of instructions that is executable by one or more processors of an apparatus to cause the apparatus to initiate an instruction processing method, the method comprising:

receiving an instruction;
determining, according to an instruction type of the instruction and the number of instructions that have been allocated to one or more instruction executing circuitries, an instruction executing circuitry from the one or more instruction executing circuitries to schedule to the instruction for execution;

allocating the instruction to the determined instruction executing circuitry; and transmitting the instruction to the allocated instruction executing circuitry for execution.

In various example embodiments described herein are described in the general context of method steps or processes, which may be implemented in one aspect by a computer program product, embodied in a computer-readable medium, including computer-executable instructions, such as program code, executed by computers to program the processors. A computer-readable medium may include removeable and nonremovable storage devices including, but not limited to, Read Only Memory, Random Access Memory, compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A. B, or C, then, unless specifically stated otherwise or infeasible, the database may include A, or B. or C, or A and B, or A and C. or B and C, or A and B and C.

Those skilled in the art should understand that the modules, circuitries, units or components of the device in the examples disclosed herein may be arranged in the device as described in the embodiments, or alternatively may be positioned in one or more devices different from the device. The modules, circuitries, units or components, may be combined into one module or, in addition, may be divided into a plurality of sub-modules.

In addition, those skilled in the art can understand that although some of the embodiments described herein include certain features included in other embodiments but not other features, the combination of features of different embodiments is meant to be within the scope of the present disclosure and form different embodiments.

As used herein, unless otherwise specified, the use of ordinal words "first," "second," "third," etc. to describe ordinary objects merely indicates different instances involving similar objects and is not intended to imply the objects described as such must have a given order in time, space, order, or in any other way.

The drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. An apparatus, comprising:
   one or more instruction executing circuitries, wherein each instruction executing circuitry of the one or more instruction executing circuitries is configured to execute an instruction of a corresponding instruction type, wherein the instruction comprises an instruction identifier indicating an execution state of the instruction, the execution state of the instruction including a first state that indicates the instruction has been allocated and has not been executed and a second state that indicates the instruction has been executed or has not been allocated; and
   an instruction scheduling circuitry that is communicatively coupled to the one or more instruction executing circuitries, the instruction scheduling circuitry is configured to:
      count, for each instruction executing circuitry, a number of instructions having an instruction identifier indicating the first state;
      determine, according to an instruction type of the instruction and the number of instructions that have been allocated to each of the one or more instruction executing circuitries, an instruction executing circuitry from the one or more instruction executing circuitries to schedule the instruction for execution;
      allocate the instruction to the determined instruction executing circuitry; and
      change the instruction identifier of the allocated instruction from the first state to the second state.

2. The apparatus of claim 1, further comprising:
   an instruction decoding circuitry configured to decode the instruction, wherein the instruction decoding circuitry is communicatively coupled to the instruction scheduling circuitry, and the instruction decoding circuitry is further configured to send the decoded instruction to the instruction scheduling circuitry.

3. The apparatus of claim 1, wherein:
   the one or more instruction executing circuitries comprise at least two instruction executing circuitries;
   the at least two instruction executing circuitries are configured to execute instructions of a same instruction type; and
   the instruction scheduling circuitry is further configured to determine, according to a difference between numbers of instructions allocated to each of the at least two instruction executing circuitries, the instruction executing circuitry to schedule the instruction for execution.

4. The apparatus of claim 3, wherein:
   the at least two instruction executing circuitries comprise a first instruction executing circuitry having a first priority and a second instruction executing circuitry having a second priority, wherein the first priority is higher than the second priority; and
   the instruction scheduling circuitry is further configured to:
      allocate the instruction to the first instruction executing circuitry in response to the difference between the number of instructions allocated to the first instruction executing circuitry and the number of instructions allocated to the second instruction executing circuitry is smaller than a predetermined threshold; and
      allocate the instruction to the second instruction executing circuitry in response to the difference between the numbers of instructions is not smaller than the predetermined threshold.

5. The apparatus of claim 3, wherein the instruction scheduling circuitry comprises:
   at least two first instruction scheduling sub-circuitries, wherein:
      each of the first instruction scheduling sub-circuitries is communicatively coupled to a corresponding instruction executing circuitry in the at least two instruction executing circuitries, and
      each of the first instruction scheduling sub-circuitries is configured to receive the instruction allocated to the corresponding instruction executing circuitry and transmit the instruction to the corresponding instruction executing circuitry for execution; and
   a first scheduling logic sub-circuitry communicatively coupled to the at least two first instruction scheduling sub-circuitries, wherein:
      the first scheduling logic sub-circuitry is configured to determine, according to a difference between the numbers of instructions that have been allocated to each of the at least two instruction executing circuitries, the instruction executing circuitry to schedule the instruction for execution, and
      allocate the instruction to a first instruction scheduling sub-circuitry that corresponds to the determined instruction executing circuitry.

6. The apparatus of claim 3, wherein:
   the instruction scheduling circuitry further comprises a second instruction scheduling sub-circuitry communicatively coupled to the at least two instruction executing circuitries; and
   the second scheduling sub-circuitry comprises:
      a second scheduling logic sub-circuitry configured to determine, according to the difference between the numbers of decoded instructions that have been allocated to each of the at least two instruction executing circuitries, the instruction executing circuitry to schedule the instruction for execution, and transmit the instruction to the determined instruction executing circuitry.

7. The apparatus of claim 1, wherein the instructions that have been allocated to the instruction executing circuitry comprise an instruction that has been allocated and has not yet been executed in the instruction scheduling circuitry, and an instruction being executed in the instruction executing circuitry.

8. The apparatus of claim 1, wherein the instruction scheduling circuitry further comprises an instruction counter, wherein the instruction counter is configured to store the number of instructions allocated to each of the one or more instruction executing circuitries.

9. A method, comprising:
receiving an instruction, wherein the instruction comprises an instruction identifier indicating an execution state of the instruction, the execution state of the instruction including a first state that indicates the instruction has been allocated and has not been executed and a second state that indicates the instruction has been executed or has not been allocated;
counting, for each instruction executing circuitry, a number of instructions having an instruction identifier indicating the first state;
determining, according to an instruction type of the instruction and the number of instructions that have been allocated to each of the one or more instruction executing circuitries, an instruction executing circuitry from the one or more instruction executing circuitries to schedule the instruction for execution;
allocating the instruction to the determined instruction executing circuitry;
changing the instruction identifier of the allocated instruction from the first state to the second state; and
transmitting the instruction to the allocated instruction executing circuitry for execution.

10. The method of claim 9, wherein:
the one or more instruction executing circuitries comprise at least two instruction executing circuitries;
the at least two instruction executing circuitries are configured to execute instructions of a same instruction type; and
wherein determining the instruction executing circuitry from the one or more instruction executing circuitry further comprises:
determining, according to a difference between numbers of instructions allocated to each of the at least two instruction executing circuitries, the instruction executing circuitry to schedule the instruction for execution.

11. The method of claim 10, wherein:
the instruction scheduling circuitry comprises:
at least two first instruction scheduling sub-circuitries, wherein each of the first instruction scheduling sub-circuitries is communicatively coupled to a corresponding instruction executing circuitry in the at least two instruction executing circuitries, and
a first scheduling logic sub-circuitry communicatively coupled to the at least two first instruction scheduling sub-circuitries; and
wherein determining the instruction executing circuitry from the one or more instruction executing circuitries further comprises:
in the first scheduling logic sub-circuitry, determining, according to a difference between the numbers of instructions that have been allocated to each of the at least two instruction executing circuitries, the instruction executing circuitry to schedule the instruction for execution,
allocating the instruction to the first instruction scheduling sub-circuitry that corresponds to the determined instruction executing circuitry,
in each of the first instruction scheduling sub-circuitries, receiving the instruction allocated to the corresponding instruction executing circuitry, and
in each of the first instruction scheduling sub-circuitries, transmitting the instruction to the corresponding instruction executing circuitry for execution.

12. The method of claim 10, wherein:
the instruction scheduling circuitry comprises a second instruction scheduling sub-circuitry communicatively coupled to the at least two instruction executing circuitries, the second instruction scheduling sub-circuitry comprising a second scheduling logic sub-circuitry; and
wherein determining the instruction executing circuitry from the one or more instruction executing circuitries further comprises:
in the second scheduling logic sub-circuitry, determining, according to the difference between the numbers of instructions that have been allocated to each of the at least two instruction executing circuitries, the instruction executing circuitry to schedule to execute the instruction, and
transmitting the instruction to the determined instruction executing circuitry by the second instruction scheduling sub-circuitry to execute the instruction.

13. The method of claim 9, wherein:
the at least two instruction executing circuitries comprise a first instruction executing circuitry having a first priority and a second instruction executing circuitry having a second priority, wherein the first priority is higher than the second priority; and
wherein determining the instruction executing circuitry from the one or more instruction executing circuitries further comprises:
allocating the instruction to the first instruction executing circuitry in response to the difference between the number of instructions allocated to the first instruction executing circuitry and the number of instructions allocated to the second instruction executing circuitry is smaller than a predetermined threshold, and
allocating the instruction to the second instruction executing circuitry in response to the difference between the numbers of instructions is not smaller than the predetermined threshold.

14. The method of claim 9, wherein the instructions that have been allocated to the instruction executing circuitry comprise an instruction that has been currently allocated and has not yet been executed and an instruction being executed in the instruction executing circuitry.

15. The method of claim 9, further comprising
obtaining, from an instruction counter, the number of instructions allocated to each instruction executing circuitry.

16. A system on chip, comprising:
an instruction processing apparatus, comprising:
one or more instruction executing circuitries, wherein each instruction executing circuitry of the one or more instruction executing circuitries is configured to execute an instruction of a corresponding instruction type, wherein the instruction comprises an instruction identifier indicating an execution state of the instruction, the execution state of the instruction including a first state that indicates the instruction has been allocated and has not been executed and a second state that indicates the instruction has been executed or has not been allocated; and an instruction scheduling circuitry that is communicatively coupled to the one or more instruction executing circuitries, the instruction scheduling circuitry is configured to:

count, for each instruction executing circuitry, a number of instructions having an instruction identifier indicating the first state;

determine, according to an instruction type of the instruction and the number of instructions that have been allocated to each of the one or more instruction executing circuitries, an instruction executing circuitry from the one or more instruction executing circuitries to schedule the instruction for execution;

allocate the instruction to the determined instruction executing circuitry to transmit the instruction to the allocated instruction executing circuitry for execution; and change the instruction identifier of the allocated instruction from the first state to the second state.

17. An intelligent device, comprising:

a system on chip, comprising:

an instruction processing apparatus, comprising:

one or more instruction executing circuitries, wherein each instruction executing circuitry of the one or more instruction executing circuitries is configured to execute an instruction of a corresponding instruction type, wherein the instruction comprises an instruction identifier indicating an execution state of the instruction, the execution state of the instruction including a first state that indicates the instruction has been allocated and has not been executed and a second state that indicates the instruction has been executed or has not been allocated; and an instruction scheduling circuitry that is coupled to the one or more instruction executing circuitries, the instruction scheduling circuitry is configured to:

count, for each instruction executing circuitry, a number of instructions having an instruction identifier indicating the first state;

determine, according to an instruction type of the instruction and the number of instructions that have been allocated to each of the one or more instruction executing circuitries, an instruction executing circuitry from the one or more instruction executing circuitries to schedule the instruction for execution;

allocate the instruction to the determined instruction executing circuitry to transmit the instruction to the allocated instruction executing circuitry for execution; and change the instruction identifier of the allocated instruction from the first state to the second state.

18. A non-transitory computer readable medium that stores a set of instructions that is executable by one or more processors of an apparatus to cause the apparatus to initiate an instruction processing method, the method comprising:

receiving an instruction, wherein the instruction comprises an instruction identifier indicating an execution state of the instruction, the execution state of the instruction including a first state that indicates the instruction has been allocated and has not been executed and a second state that indicates the instruction has been executed or has not been allocated;

counting, for each instruction executing circuitry, a number of instructions having an instruction identifier indicating the first state;

determining, according to an instruction type of the instruction and the number of instructions that have been allocated to each of the one or more instruction executing circuitries, an instruction executing circuitry from the one or more instruction executing circuitries to schedule to the instruction for execution;

allocating the instruction to the determined instruction executing circuitry;

changing the instruction identifier of the allocated instruction from the first state to the second state; and transmitting the instruction to the allocated instruction executing circuitry for execution.

* * * * *